(12) United States Patent
Chang et al.

(10) Patent No.: US 9,811,210 B2
(45) Date of Patent: Nov. 7, 2017

(54) OPTICAL TOUCH MODULE AND METHOD FOR DETERMINING GESTURES THEREOF AND COMPUTER-READABLE MEDIUM

(71) Applicant: Wistron Corporation, New Taipei (TW)

(72) Inventors: Hsun-Hao Chang, New Taipei (TW); Yu-Yen Chen, New Taipei (TW); Chun-Chao Chang, New Taipei (TW); Shou-Te Wei, New Taipei (TW); Sheng-Hsien Hsieh, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 587 days.

(21) Appl. No.: 13/726,631

(22) Filed: Dec. 26, 2012

(65) Prior Publication Data

US 2013/0314378 A1 Nov. 28, 2013

(30) Foreign Application Priority Data

May 25, 2012 (TW) .............................. 101118725 A

(51) Int. Cl.
*G06F 3/042* (2006.01)
*G06F 3/0488* (2013.01)
*G06F 3/041* (2006.01)

(52) U.S. Cl.
CPC .......... *G06F 3/0428* (2013.01); *G06F 3/0416* (2013.01); *G06F 3/0488* (2013.01); *G06F 3/04883* (2013.01); *G06F 2203/04104* (2013.01)

(58) Field of Classification Search
CPC .. G06F 3/0428; G06F 3/0488; G06F 3/04883; G06F 2203/04104; G06F 3/0416
See application file for complete search history.

(56) References Cited

U.S. PATENT DOCUMENTS

| | | | |
|---|---|---|---|
| 6,421,042 B1 * | 7/2002 | Omura | G06F 3/011 345/156 |
| 7,411,575 B2 | 8/2008 | Hill et al. | |

(Continued)

FOREIGN PATENT DOCUMENTS

TW 201203055 1/2012

OTHER PUBLICATIONS

"Office Action of Taiwan Counterpart Application" with English translation thereof, dated May 15, 2014, p. 1-p. 9, in which the listed references were cited.

(Continued)

*Primary Examiner* — David Tung
(74) *Attorney, Agent, or Firm* — JCIPRNET

(57) ABSTRACT

An optical touch module, a method for determining gestures thereof and a computer-readable medium are provided. The method includes the following steps. A plurality of first sensing results outputted by a first optical sensor which continuously senses a touch area from a first corner of the touch area are obtained. A plurality of second sensing results outputted by a second optical sensor which continuously senses the touch area from a second corner of the touch area are obtained. A gesture is determined according a first center of a plurality of first touch reference points of each of the first sensing results and a second center of a plurality of second touch reference points of each of the second sensing results.

7 Claims, 8 Drawing Sheets

(56) References Cited

U.S. PATENT DOCUMENTS

| | | |
|---|---|---|
| 8,576,200 B2 | 11/2013 | Zhu et al. |
| 2010/0201639 A1 | 8/2010 | Huang et al. |
| 2011/0122099 A1 | 5/2011 | Zhu et al. |

OTHER PUBLICATIONS

"Office Action of China Counterpart Application," dated Oct. 10, 2015, with English translation thereof, p. 1-p. 15.

* cited by examiner

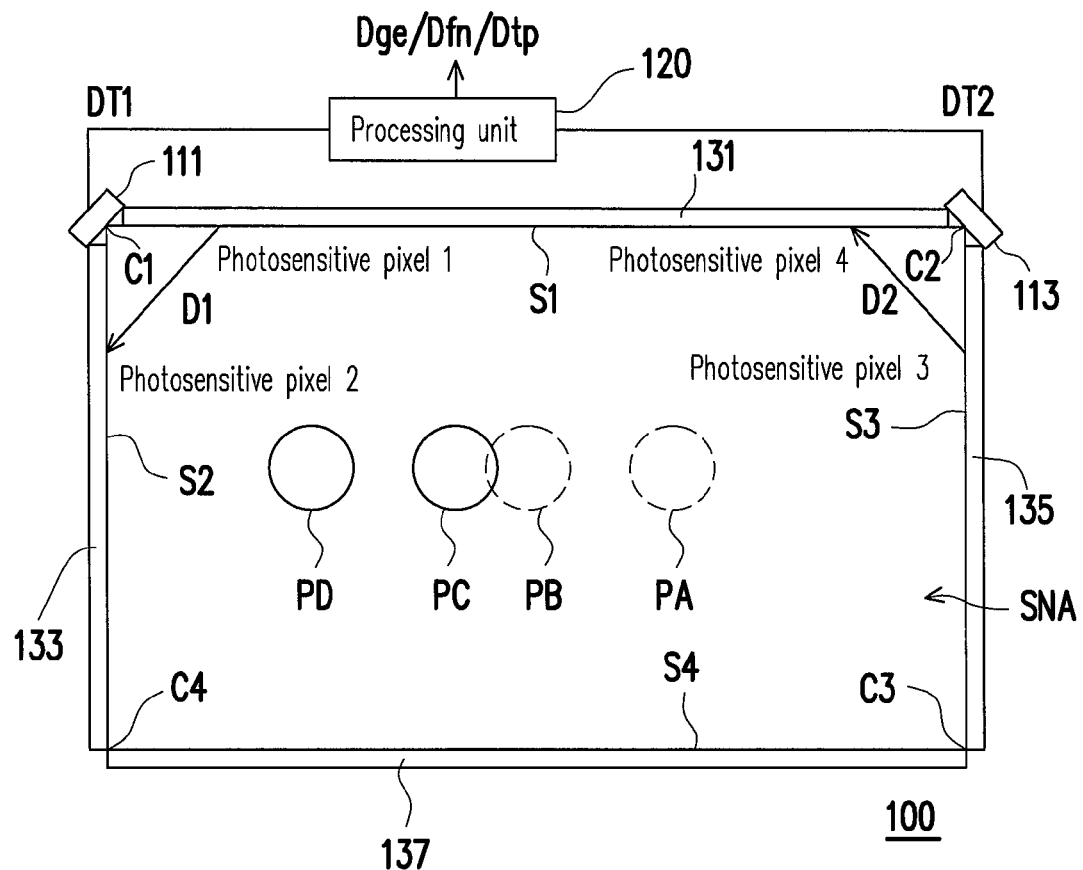
FIG. 1A
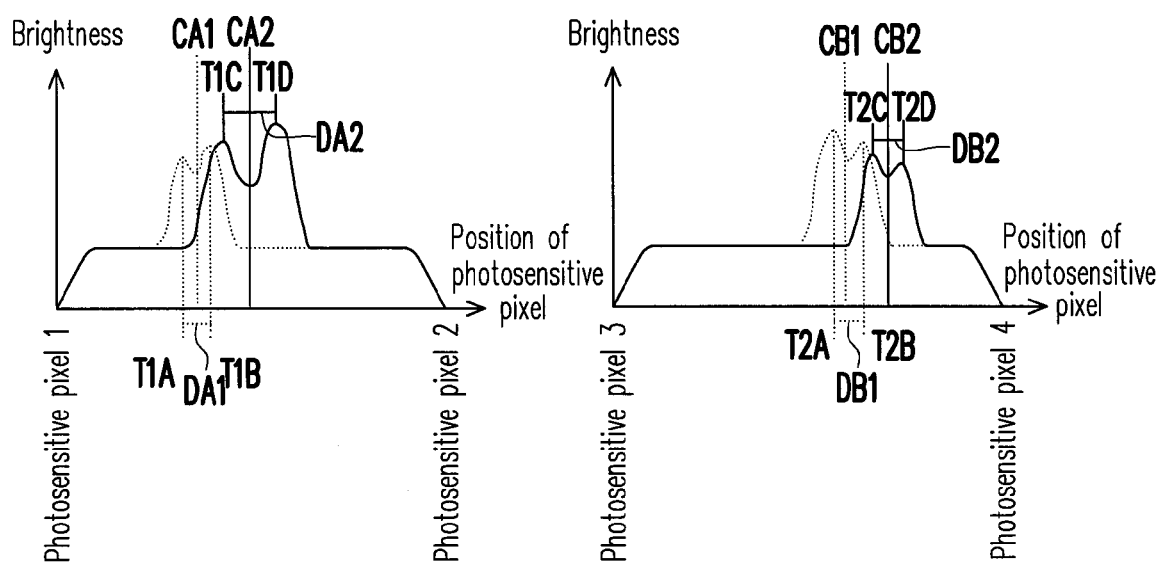
FIG. 1B
FIG. 1C

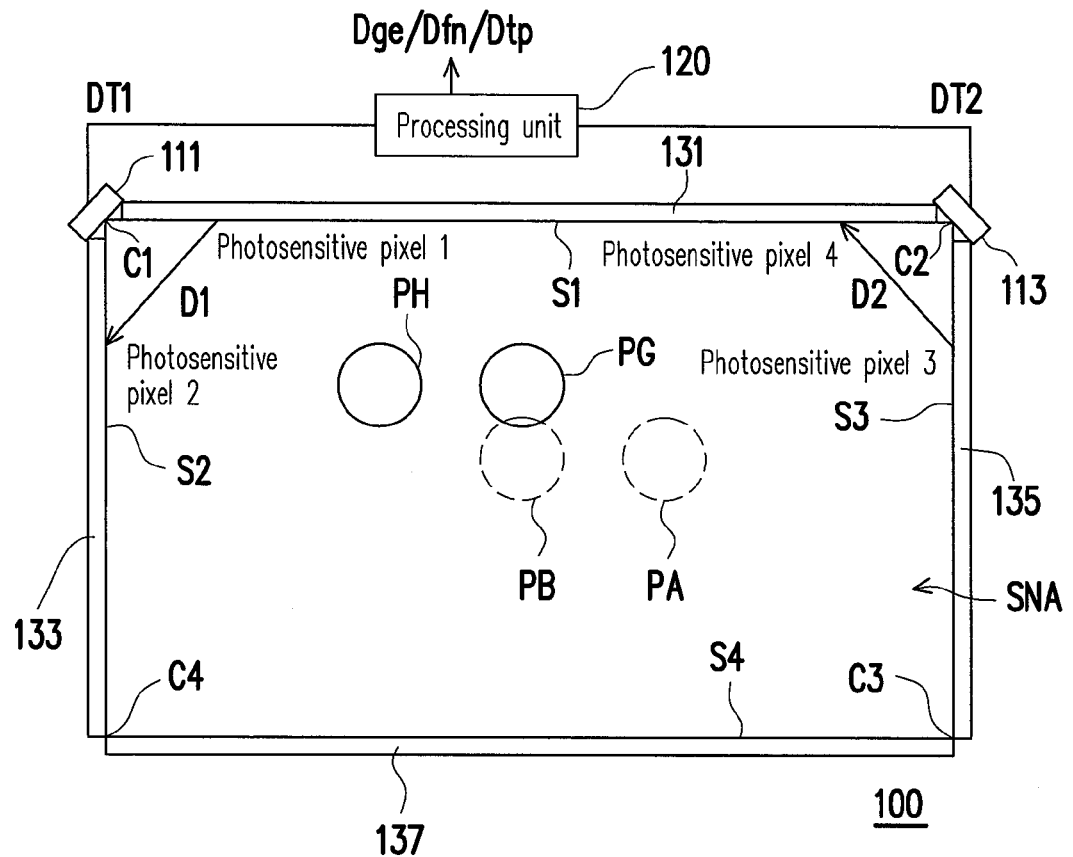
FIG. 3A
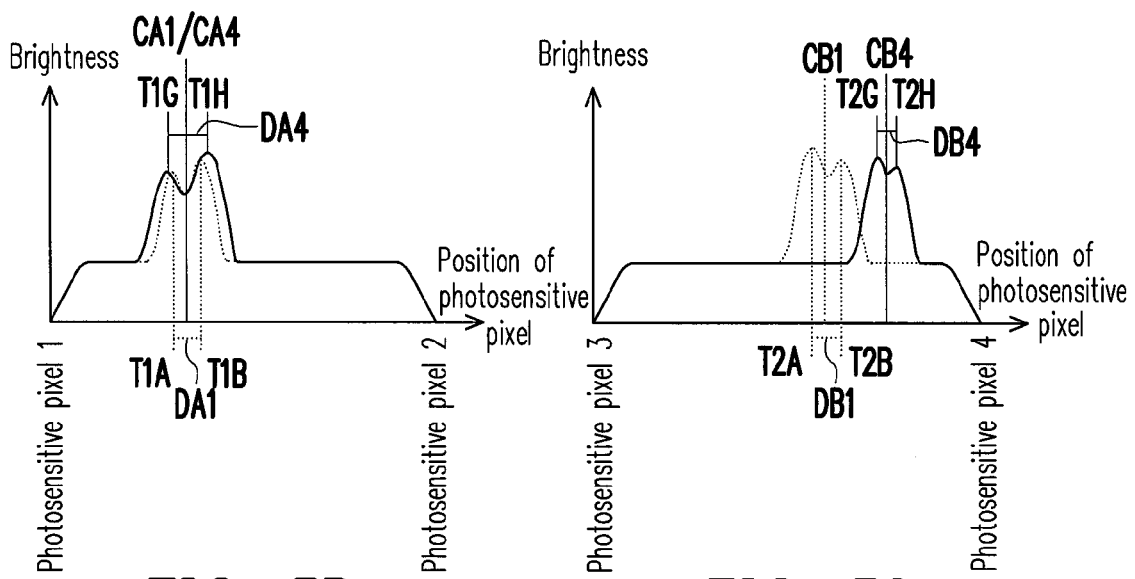
FIG. 3B
FIG. 3C

OPTICAL TOUCH MODULE AND METHOD FOR DETERMINING GESTURES THEREOF AND COMPUTER-READABLE MEDIUM

CROSS-REFERENCE TO RELATED APPLICATION

This application claims the priority benefit of Taiwan application serial no. 101118725, filed on May 25, 2012. The entirety of the above-mentioned patent application is hereby incorporated by reference herein and made a part of this specification.

BACKGROUND

Technical Field

The disclosure relates to a touch module and a method for determining gestures. Particularly, the disclosure relates to an optical touch module, a method for determining gestures thereof and a computer-readable medium.

Related Art

In recent years, along with quick development of various applications such as information technology, wireless mobile communications and information home appliances, etc., in order to achieve effects of more convenience, more compact in size and more user-friendly in usage, input devices of information products have been changed from conventional keyboards or mice, etc. to touch modules. The touch modules are roughly grouped into resistive, capacitive, optical, acoustic wave and electromagnetic touch modules, etc., and a touch mechanism of the optical touch module is suitable for a large-size display panel. In case that the sizes of the display panels gradually increase, the optical touch modules are widely used.

Along with development of a multi-touch technique, the touch modules using the multi-touch technique are used to ensure a user a more intuitive operating experience. Moreover, since touch gestures derived from the multi-touch technique can intuitively activate operation functions, the whole operation of the touch module can be more convenient. Generally, after the touch module finds a plurality of touch points, the touch gesture is determined according to variation of the touch points, so as to activate the corresponding operation function. However, in the optical touch module, determination of the multiple touch points is complicated. Therefore, to efficiently determine the touch gestures through the optical touch module is important for enhancing the touch convenience of the optical touch module.

SUMMARY

The disclosure is directed to an optical touch module, a method for determining gestures thereof and a computer-readable medium, by which a touch gesture is directly determined without determining touch points, so as to enhance touch convenience of the optical touch module.

The disclosure provides an optical touch module including a first optical sensor, a second optical sensor and a processing unit. The first optical sensor is disposed corresponding to a first corner of a touch area for continuously sensing the touch area to output a plurality of first sensing results. The second optical sensor is disposed corresponding to a second corner of the touch area for continuously sensing the touch area to output a plurality of second sensing results. The processing unit is coupled to the first optical sensor and the second optical sensor, and determines a gesture according to a first center point of a plurality of first touch reference points of each of the first sensing results and a second center point of a plurality of second touch reference points of each of the second sensing results.

In an embodiment of the disclosure, an ascending arrangement direction of position numbers of a plurality of first photosensitive pixels of the first optical sensor is the same to a first direction from a first side of the touch area to a second side of the touch area, and an ascending arrangement direction of position numbers of a plurality of second photosensitive pixels of the second optical sensor is the same to a second direction from a third side of the touch area to the first side, the first corner is formed by the first side and the second side, and the second corner is formed by the first side and the third side.

In an embodiment of the disclosure, when a moving amount of the first center point moving along the first direction is greater than a predetermined value and a moving amount of the second center point moving along the second direction is greater than the predetermined value, the processing unit determines that the gesture moves towards the second side.

In an embodiment of the disclosure, when a moving amount of the first center point moving along a direction opposite to the first direction is greater than a predetermined value and a moving amount of the second center point moving along a direction opposite to the second direction is greater than the predetermined value, the processing unit determines that the gesture moves towards the third side.

In an embodiment of the disclosure, when a moving amount of the first center point moving along the first direction is greater than a predetermined value and a moving amount of the second center point moving along a direction opposite to the second direction is greater than the predetermined value, the processing unit determines that the gesture moves towards a fourth side of the touch area opposite to the first side.

In an embodiment of the disclosure, when a moving amount of the first center point moving along a direction opposite to the first direction is greater than a predetermined value and a moving amount of the second center point moving along the second direction is greater than the predetermined value, the processing unit determines that the gesture moves towards the first side.

In an embodiment of the disclosure, when a moving amount of the first center point is smaller than or equal to a predetermined value, and a moving amount of the second center point moving along the second direction is greater than the predetermined value, the processing unit determines that the gesture moves towards the first corner.

In an embodiment of the disclosure, when a moving amount of the first center point is smaller than or equal to a predetermined value, and a moving amount of the second center point moving along a direction opposite to the second direction is greater than the predetermined value, the processing unit determines that the gesture moves towards a third corner of the touch area opposite to the first corner.

In an embodiment of the disclosure, when a moving amount of the first center point moving along a direction opposite to the first direction is greater than a predetermined value, and a moving amount of the second center point is smaller than or equal to the predetermined value, the processing unit determines that the gesture moves towards the second corner.

In an embodiment of the disclosure, when a moving amount of the first center point moving along the first direction is greater than a predetermined value, and a moving amount of the second center point is smaller than or equal to the predetermined value, the processing unit determines that the gesture moves towards a fourth corner of the touch area opposite to the second corner.

In an embodiment of the disclosure, when moving amounts of the first center point and the second center point are smaller than or equal to a predetermined value, and at least a first space between the first touch reference points and at least a second space between the second touch reference points are periodically increased and decreased, the processing unit determines that the gesture is a turning gesture.

In an embodiment of the disclosure, when moving amounts of the first center point and the second center point are smaller than or equal to a predetermined value, and at least a first space between the first touch reference points and at least a second space between the second touch reference points are decreased, the processing unit determines that the gesture is a pinch gesture.

In an embodiment of the disclosure, when moving amounts of the first center point and the second center point are smaller than or equal to a predetermined value, and at least a first space between the first touch reference points and at least a second space between the second touch reference points are increased, the processing unit determines that the gesture is a spread gesture.

In an embodiment of the disclosure, when the processing unit determines that a plurality of touch points in the touch area sequentially move towards the first corner, the second corner, a third corner opposite to the first corner and a fourth corner opposite to the second corner or sequentially move towards the first corner, the fourth corner, the third corner and the second corner according to the first center point and the second center point, the processing unit determines that the gesture draws a circle.

In an embodiment of the disclosure, the processing unit determines the gesture according to the continuous first sensing results having the first touch reference points and the continuous second sensing results having the second touch reference points.

In an embodiment of the disclosure, the optical touch module further includes a plurality of light-absorbing bars, which are disposed corresponding to a plurality of sides of the touch area, where the first touch reference points and the second touch reference points are respectively a bright point.

In an embodiment of the disclosure, the optical touch module further includes a plurality of light-reflecting bars, which are disposed corresponding to a plurality of sides of the touch area, where the first touch reference points and the second touch reference points are respectively a dark point.

The disclosure provides a method for determining gestures of an optical touch module, which includes the following steps. A plurality of first sensing results outputted by a first optical sensor which continuously senses a touch area from a first corner of the touch area are obtained. A plurality of second sensing results outputted by a second optical sensor which continuously senses the touch area from a second corner of the touch area are obtained. A gesture is determined according a first center point of a plurality of first touch reference points of each of the first sensing results and a second center point of a plurality of second touch reference points of each of the second sensing results.

In an embodiment of the disclosure, an ascending arrangement direction of position numbers of a plurality of first photosensitive pixels of the first optical sensor is the same to a first direction from a first side of the touch area to a second side of the touch area, and an ascending arrangement direction of position numbers of a plurality of second photosensitive pixels of the second optical sensor is the same to a second direction from a third side of the touch area to the first side, the first corner is formed by the first side and the second side, and the second corner is formed by the first side and the third side.

In an embodiment of the disclosure, the step of determining the gesture according to the first center point of the first touch reference points of each of the first sensing results and the second center point of the second touch reference points of each of the second sensing results includes: determining that the gesture moves towards the second side when a moving amount of the first center point moving along the first direction is greater than a predetermined value and a moving amount of the second center point moving along the second direction is greater than the predetermined value.

In an embodiment of the disclosure, the step of determining the gesture according to the first center point of the first touch reference points of each of the first sensing results and the second center point of the second touch reference points of each of the second sensing results includes: determining that the gesture moves towards the third side when a moving amount of the first center point moving along a direction opposite to the first direction is greater than a predetermined value and a moving amount of the second center point moving along a direction opposite to the second direction is greater than the predetermined value.

In an embodiment of the disclosure, the step of determining the gesture according to the first center point of the first touch reference points of each of the first sensing results and the second center point of the second touch reference points of each of the second sensing results includes: determining that the gesture moves towards a fourth side of the touch area opposite to the first side of the touch area when a moving amount of the first center point moving along the first direction is greater than a predetermined value and a moving amount of the second center point moving along a direction opposite to the second direction is greater than the predetermined value.

In an embodiment of the disclosure, the step of determining the gesture according to the first center point of the first touch reference points of each of the first sensing results and the second center point of the second touch reference points of each of the second sensing results includes: determining that the gesture moves towards the first side when a moving amount of the first center point moving along a direction opposite to the first direction is greater than a predetermined value and a moving amount of the second center point moving along the second direction is greater than the predetermined value.

In an embodiment of the disclosure, the step of determining the gesture according to the first center point of the first touch reference points of each of the first sensing results and the second center point of the second touch reference points of each of the second sensing results includes: determining that the gesture moves towards the first corner when a moving amount of the first center point is smaller than or equal to a predetermined value, and a moving amount of the second center point moving along the second direction is greater than the predetermined value.

In an embodiment of the disclosure, the step of determining the gesture according to the first center point of the first touch reference points of each of the first sensing results and the second center point of the second touch reference points of each of the second sensing results includes: determining that the gesture moves towards a third corner of the touch area opposite to the first corner when a moving amount of the first center point is smaller than or equal to a predetermined value, and a moving amount of the second center point moving along a direction opposite to the second direction is greater than the predetermined value.

In an embodiment of the disclosure, the step of determining the gesture according to the first center point of the first touch reference points of each of the first sensing results and the second center point of the second touch reference points of each of the second sensing results includes: determining that the gesture moves towards the second corner when a moving amount of the first center point moving along a direction opposite to the first direction is greater than a predetermined value, and a moving amount of the second center point is smaller than or equal to the predetermined value.

In an embodiment of the disclosure, the step of determining the gesture according to the first center point of the first touch reference points of each of the first sensing results and the second center point of the second touch reference points of each of the second sensing results includes: determining that the gesture moves towards a fourth corner of the touch area opposite to the second corner when a moving amount of the first center point moving along the first direction is greater than a predetermined value, and a moving amount of the second center point is smaller than or equal to the predetermined value.

In an embodiment of the disclosure, the step of determining the gesture according to the first center point of the first touch reference points of each of the first sensing results and the second center point of the second touch reference points of each of the second sensing results includes: determining that the gesture is a turning gesture when moving amounts of the first center point and the second center point are smaller than or equal to a predetermined value, and at least a first space between the first touch reference points and at least a second space between the second touch reference points are periodically increased and decreased.

In an embodiment of the disclosure, the step of determining the gesture according to the first center point of the first touch reference points of each of the first sensing results and the second center point of the second touch reference points of each of the second sensing results includes: determining that the gesture is a pinch gesture when moving amounts of the first center point and the second center point are smaller than or equal to a predetermined value, and at least a first space between the first touch reference points and at least a second space between the second touch reference points are decreased.

In an embodiment of the disclosure, the step of determining the gesture according to the first center point of the first touch reference points of each of the first sensing results and the second center point of the second touch reference points of each of the second sensing results includes: determining that the gesture is a spread gesture when moving amounts of the first center point and the second center point are smaller than or equal to a predetermined value, and at least a first space between the first touch reference points and at least a second space between the second touch reference points are increased.

In an embodiment of the disclosure, the step of determining the gesture according to the first center point of the first touch reference points of each of the first sensing results and the second center point of the second touch reference points of each of the second sensing results includes: determining that the gesture draws a circle when it is determined that a plurality of touch points in the touch area sequentially move towards the first corner, the second corner, a third corner opposite to the first corner and a fourth corner opposite to the second corner or sequentially move towards the first corner, the fourth corner, the third corner and the second corner according to the first center point and the second center point.

The disclosure provides a computer-readable medium, which is configured to store a program, and the program is used to execute the steps of the method for determining gestures of an optical touch module.

According to the above descriptions, in the optical touch module, the method for determining gestures thereof and the computer-readable medium, the touch gesture is determined according to the first center point of the first touch reference points of each of the first sensing results and the second center point of the second touch reference points of each of the second sensing results. In this way, the optical touch module can accurately determine the touch gesture of the user without determining positions of the touch points, by which touch convenience of the optical touch module is enhanced.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 1A to FIG. 1C are schematic diagrams illustrating an optical touch module senses a touch gesture of a touch area according to a first embodiment of the disclosure.

FIG. 3A-FIG. 3C are schematic diagrams illustrating an optical touch module senses a touch gesture of a touch area according to a third embodiment of the disclosure.

DETAILED DESCRIPTION OF DISCLOSED EMBODIMENTS

Figure 2A:
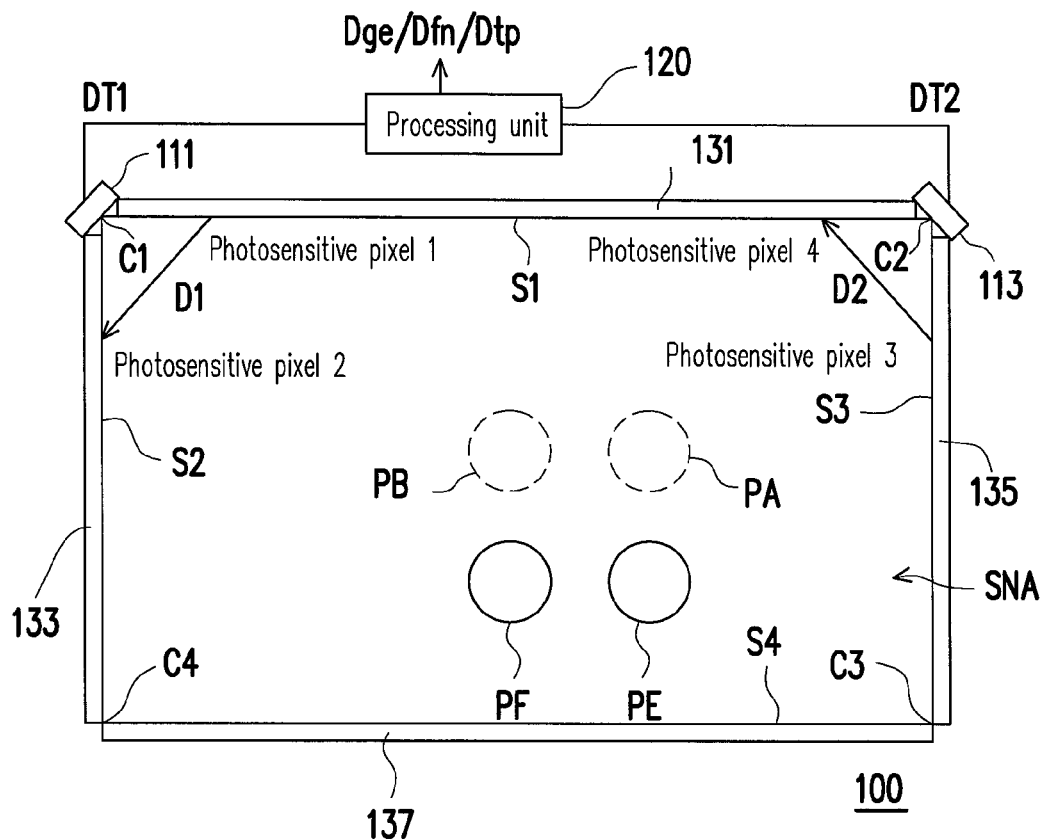
FIG. 2A-FIG. 2C are schematic diagrams illustrating an optical touch module senses a touch gesture of a touch area according to a second embodiment of the disclosure.

FIG. 1A to FIG. 1C are schematic diagrams illustrating an optical touch module senses a touch gesture of a touch area according to a first embodiment of the disclosure. Referring to FIG. 1A, in the present embodiment, the optical touch module 100 includes optical sensors 111 and 113, a processing unit 120 and a plurality of light-absorbing bars 131, 133, 135 and 137. The optical sensor 111 (corresponding to a first optical sensor) is disposed corresponding to a corner C1 (corresponding to a first corner) of a touch area SNA, and continuously senses the touch area SNA from the corner C1 to output a plurality of first sensing results DT1. The second optical sensor 113 (corresponding to a second optical sensor) is disposed corresponding to a corner C2 (corresponding to a second corner) of the touch area SNA, and continuously senses the touch area SNA from the corner C2 to output a plurality of second sensing results DT2. The light-absorbing bars 131, 133, 135 and 137 are respectively disposed corresponding to a plurality of sides S1, S2, S3 and S4.

The processing unit 120 is coupled to the optical sensors 111 and 113, and determines whether touch points (for example, PA-PD) appear in the touch area SNA according to the first sensing results DT1 and the second sensing results DT2. When the touch points (for example, PA-PD) appear in the touch area SNA, the processing unit 120 determines whether the number of the touch points (for example, PA-PD) is one (i.e. determines that the user performs a single-touch operation) or plural (i.e. determines that the user performs a multi-touch operation). When the number of the touch points in the touch area SNA is one, the processing unit 120 determines a position of the touch point (for example, one of the touch points PA-PD), and output corresponding touch data Dtp. When the number of the touch points in the touch area SNA is plural, the processing unit 120 determines movements of the touch points to determine a touch gesture of the user. Now, the processing unit 120 may output gesture data Dge corresponding to the touch gesture of the user, or output corresponding function data Dfn according to a touch function corresponding to the touch gesture.

In the present embodiment, assuming the optical sensors 111 and 113 are respectively composed of a plurality of photosensitive pixels arranged in a row, sensing angles can be calculated according to positions of the photosensitive pixels, i.e. each angle corresponds to the photosensitive pixel of a specific position. Moreover, to facilitate descriptions, it is assumed that an ascending arrangement direction of position numbers of the photosensitive pixels of the optical sensor 111 is the same to a first direction D1 (i.e. a direction from a photosensitive pixel 1 to a photosensitive pixel 2) from the side S1 (corresponding to a first side) to the side S2 (corresponding to a second side), and an ascending arrangement direction of position numbers of the photosensitive pixels of the optical sensor 113 is the same to a second direction D2 (i.e. a direction from a photosensitive pixel 3 to a photosensitive pixel 4) from the side S3 (corresponding to a third side) to the side S1.

As shown in FIG. 1A, the side S1 is opposite to the side S4 (corresponding to a fourth side), and the side S2 is opposite to the side S3. The corner C1 formed by the sides S1 and S2 is opposite to the corner C3 (corresponding to a third corner) formed by the sides S3 and S4, and the corner C2 formed by the sides S1 and S3 is opposite to the corner C4 (corresponding to a fourth corner) formed by the sides S2 and S4.

Referring to FIG. 1A to FIG. 1C, FIG. 1B is a brightness schematic diagram of the first sensing results DT1, and FIG. 1C is a brightness schematic diagram of the second sensing results DT2. In the present embodiment, since the light-absorbing bars 131, 133, 135 and 137 are respectively disposed at the sides S1, S2, S3 and S4 of the touch area SNA, first touch reference points (for example, T1A-T1D) and second touch reference points (for example, T2A-T2D) in the first sensing result DT1 and the second sensing result DT2 corresponding to the touch points (for example, PA-PD) are respectively points with higher brightness (i.e. bright points).

In an embodiment of the disclosure, it is assumed that a plurality of touch points (two touch points are taken as an example for descriptions) of the touch area SNA move from the touch points PA and PB to the touch points PC and PD, i.e. the touch points of the touch area SNA move towards the side S2, and a space between the touch points PA and PB is approximately the same to a space between the touch points PC and PD. Now, the first touch reference points in the first sensing result DT1 correspondingly move from the first touch reference points T1A and T1B to the first touch reference points T1C and T1D, i.e. a center point of the first touch reference points moves from a center point CA1 (corresponding to a first center point) of the first touch reference points T1A and T1B to a center point CA2 (corresponding to a first center point) of the first touch reference points T1C and T1D. According to a moving direction shown in the figure, a moving direction of the center point of the first touch reference points (i.e. a direction from the center point CA1 to the center point CA2) is the same to the ascending arrangement direction (i.e. the first direction D1) of the position numbers of the photosensitive pixels of the optical sensor 111.

On the other hand, the second touch reference points in the second sensing result DT2 correspondingly move from the second touch reference points T2A and T2B to the second touch reference points T2C and T2D, i.e. a center point of the second touch reference points moves from a center point CB1 (corresponding to a second center point) of the second touch reference points T2A and T2B to a center point CB2 (corresponding to a second center point) of the second touch reference points T2C and T2D. According to a moving direction shown in the figure, a moving direction of the center point of the second touch reference points (i.e. a direction from the center point CB1 to the center point CB2) is the same to the ascending arrangement direction (i.e. the second direction D2) of the position numbers of the photosensitive pixels of the optical sensor 113.

Moreover, in order to avoid misjudging movement of the center point (for example, CA1, CA2, CB1 or CB2) due to an error caused by shake of the fingers or the touch mechanism, a predetermined value is set, and it is determined that the center point does not move when a moving amount of the center point (for example, CA1, CA2, CB1 or CB2) is smaller than or equal to the predetermined value, and it is determined that the center point moves when the moving amount of the center point (for example, CA1, CA2, CB1 or CB2) is greater than the predetermined value. A unit of the predetermined value can be the photosensitive pixel (for example, a width of 10 photosensitive pixels), which can be determined according to the ordinary knowledge of the art.

According to the above descriptions, when the moving amount of the center point (for example, CA1, CA2) of the first touch reference points (for example, T1A-T1D) of the first sensing result DT1 that moves along the first direction D1 is greater than the predetermined value, and the moving amount of the center point (for example, CB1, CB2) of the second touch reference points (for example, T2A-T2D) of the second sensing result DT2 that moves along the second direction D2 is greater than the predetermined value, the processing unit 120 determines that the touch gesture of the user moves towards the side S2, i.e. moves to the left in view of the user.

Moreover, since the touch points PC and PD are closer to the optical sensor 111 compared to the touch points PA and PB, a space DA2 (corresponding to a first space) between the first touch reference points T1C and T1D is greater than a space DA1 (corresponding to a first space) between the first touch reference points T1A and T1B, i.e. the space between the first touch reference points is gradually increased along with time. Moreover, since the touch points PC and PD are away from the optical sensor 113 compared to the touch points PA and PB, a space DB2 (corresponding to a second space) between the second touch reference points T2C and T2D is smaller than a space DB1 (corresponding to a second space) between the second touch reference points T2A and T2B, i.e. the space between the second touch reference points is gradually decreased along with time.

According to the above descriptions, in an embodiment of the disclosure, when the moving amount of the center point (for example, CA1, CA2) of the first touch reference points (for example, T1A-T1D) of the first sensing result DT1 that moves along the first direction D1 is greater than the predetermined value, the moving amount of the center point (for example, CB1, CB2) of the second touch reference points (for example, T2A-T2D) of the second sensing result DT2 that moves along the second direction D2 is greater than the predetermined value, the space (for example, DA1, DA2) between the first touch reference points (for example, T1A-T1D) is increased and the space (for example, DB1, DB2) between the second touch reference points (for example, T2A-T2D) is decreased, the processing unit 120 determines that the touch gesture of the user moves to the left.

Moreover, since the processing unit 120 generally determines the touch gesture through more than two first sensing results DT1 and more than two second sensing results DT2, when the first sensing results DT1 has a plurality of the first touch reference points (for example, T1A-T1D) or the second sensing results DT2 has a plurality of the second touch reference points (for example, T2A-T2D), the processing unit 120 determines the touch gesture according to the continuous first sensing results DT1 having the first touch reference points (for example, T1A-T1D) and the continuous second sensing results DT2 having the second touch reference points (for example, T2A-T2D).

In an embodiment of the disclosure, it is assumed that a plurality of the touch points (two touch points are taken as an example for descriptions) of the touch area SNA move from the touch points PC and PD to the touch points PA and PB, i.e. the touch points of the touch area SNA move towards the side S3. Now, the first touch reference points in the first sensing result DT1 correspondingly move from the first touch reference points T1C and T1D to the first touch reference points T1A and T1B, i.e. the center point of the first touch reference points moves from the center point CA2 to the center point CA1. According to a moving direction shown in the figure, a moving direction of the center point of the first touch reference points (i.e. a direction from the center point CA2 to the center point CA1) is opposite to the ascending arrangement direction (i.e. a direction opposite to the first direction D1) of the position numbers of the photosensitive pixels of the optical sensor 111.

On the other hand, the second touch reference points in the second sensing result DT2 correspondingly move from the second touch reference points T2C and T2D to the second touch reference points T2A and T2B, i.e. the center point of the second touch reference points moves from the center point CB2 to the center point CB1. According to a moving direction shown in the figure, a moving direction of the center point of the second touch reference points (i.e. a direction from the center point CB2 to the center point CB1) is opposite to the ascending arrangement direction (i.e. a direction opposite to the second direction D2) of the position numbers of the photosensitive pixels of the optical sensor 113.

According to the above descriptions, when the moving amount of the center point (for example, CA1, CA2) of the first touch reference points (for example, T1A-T1D) of the first sensing result DT1 that moves along the direction opposite to the first direction D1 is greater than the predetermined value, and the moving amount of the center point (for example, CB1, CB2) of the second touch reference points (for example, T2A-T2D) of the second sensing result DT2 that moves along the second direction D2 is greater than the predetermined value, the processing unit 120 determines that the touch gesture of the user moves towards the side S3, i.e. moves to the right in view of the user.

Moreover, the space DA1 is smaller than the space DA2, which represents that the space between the first touch reference points is gradually decreased along with time. Moreover, the space DB1 is greater than the space DB2, which represents that the space between the second touch reference points is gradually increased along with time. According to the above descriptions, in an embodiment of the disclosure, when the moving amount of the center point (for example, CA1, CA2) of the first touch reference points (for example, T1A-T1D) of the first sensing result DT1 that moves along the direction opposite to the first direction D1 is greater than the predetermined value, the moving amount of the center point (for example, CB1, CB2) of the second touch reference points (for example, T2A-T2D) of the second sensing result DT2 that moves along the second direction D2 is greater than the predetermined value, the space (for example, DA1, DA2) between the first touch reference points (for example, T1A-T1D) is decreased and the space (for example, DB1, DB2) between the second touch reference points (for example, T2A-T2D) is increased, the processing unit 120 determines that the touch gesture of the user moves to the right.

Figure 2B:
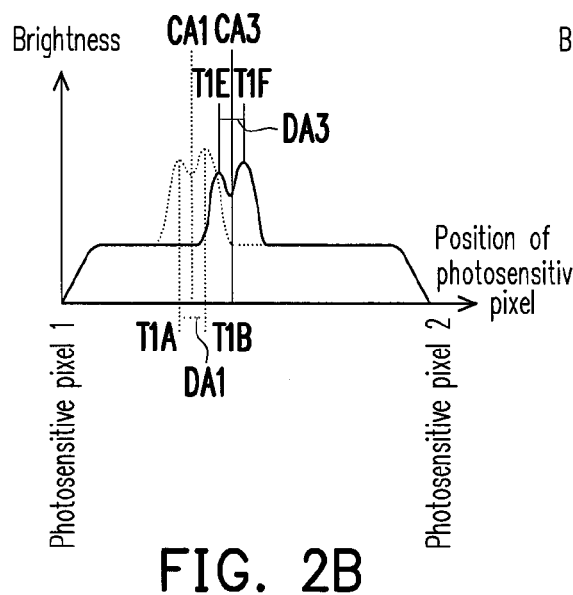
Figure 2C:
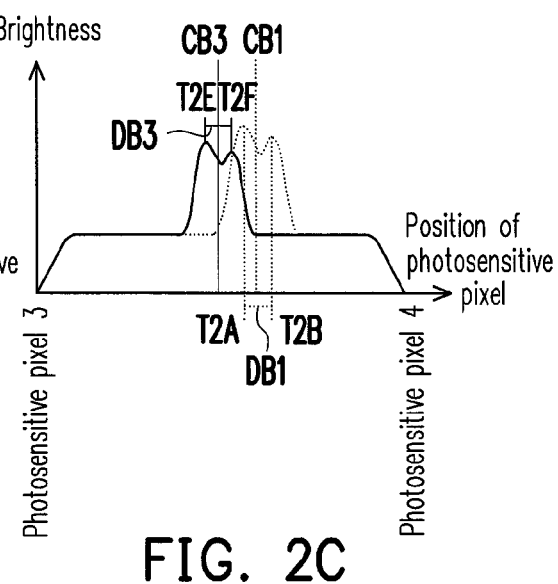

FIG. 2A-FIG. 2C are schematic diagrams illustrating an optical touch module senses a touch gesture of a touch area according to a second embodiment of the disclosure. Referring to FIG. 1A-FIG. 1C and FIG. 2A-FIG. 2C, a difference there between is that the touch points (for example, PA, PB, PE and PF) sensed by the optical touch module 100 are different, i.e. a brightness schematic diagram of the first sensing results DT1 of FIG. 2B is different to that of FIG. 1B, and a brightness schematic diagram of the second sensing results DT2 of FIG. 2C is different to that of FIG. 1C.

In an embodiment of the disclosure, it is assumed that a plurality of touch points (two touch points are taken as an example for descriptions) of the touch area SNA move from the touch points PA and PB to the touch points PE and PF, i.e. the touch points of the touch area SNA move towards the side S4, and a space between the touch points PA and PB is approximately the same to a space between the touch points PE and PF. Now, the first touch reference points in the first sensing result DT1 correspondingly move from the first touch reference points T1A and T1B to the first touch reference points T1E and T1F, i.e. a center point of the first touch reference points moves from the center point CA1 of the first touch reference points T1A and T1B to a center point CA3 of the first touch reference points T1E and T1F. According to a moving direction shown in the figure, a moving direction of the center point of the first touch reference points (i.e. a direction from the center point CA1 to the center point CA3) is the same to the ascending arrangement direction (i.e. the first direction D1) of the position numbers of the photosensitive pixels of the optical sensor 111.

On the other hand, the second touch reference points in the second sensing result DT2 correspondingly move from the second touch reference points T2A and T2B to the second touch reference points T2E and T2F, i.e. a center point of the second touch reference points moves from the center point CB1 of the second touch reference points T2A and T2B to a center point CB3 of the second touch reference points T2E and T2F. According to a moving direction shown in the figure, a moving direction of the center point of the second touch reference points (i.e. a direction from the center point CB1 to the center point CB3) is opposite to the ascending arrangement direction (i.e. the direction opposite to the second direction D2) of the position numbers of the photosensitive pixels of the optical sensor 113.

According to the above descriptions, when the moving amount of the center point (for example, CA1, CA3) of the first touch reference points (for example, T1A, T1B, T1E and T1F) of the first sensing result DT1 that moves along the first direction D1 is greater than the predetermined value, and the moving amount of the center point (for example, CB1, CB3) of the second touch reference points (for example, T2A, T2B, T2E and T2F) of the second sensing result DT2 that moves along the direction opposite to the second direction D2 is greater than the predetermined value, the processing unit 120 determines that the touch gesture of the user moves towards the side S4, i.e. moves downwards in view of the user.

Moreover, since the touch points PE and PF are away from the optical sensor 111 compared to the touch points PA and PB, a space DA3 between the first touch reference points T1E and T1F is smaller than the space DA1 between the first touch reference points T1A and T1B, i.e. the space between the first touch reference points is gradually decreased along with time. Moreover, since the touch points PE and PF are away from the optical sensor 113 compared to the touch points PA and PB, a space DB3 between the second touch reference points T2E and T2F is smaller than the space DB1 between the second touch reference points T2A and T2B, i.e. the space between the second touch reference points is gradually decreased along with time.

According to the above descriptions, in an embodiment of the disclosure, when the moving amount of the center point (for example, CA1, CA3) of the first touch reference points (for example, T1A, T1B, T1E and T1F) of the first sensing result DT1 that moves along the first direction D1 is greater than the predetermined value, the moving amount of the center point (for example, CB1, CB3) of the second touch reference points (for example, T2A, T2B, T2E and T2F) of the second sensing result DT2 that moves along the direction opposite to the second direction D2 is greater than the predetermined value, the space (for example, DA1, DA3) between the first touch reference points (for example, T1A, T1B, T1E and T1F) is decreased and the space (for example, DB1, DB3) between the second touch reference points (for example, T2A, T2B, T2E and T2F) is decreased, the processing unit 120 determines that the touch gesture of the user moves downwards.

In an embodiment of the disclosure, it is assumed that a plurality of the touch points (two touch points are taken as an example for descriptions) of the touch area SNA move from the touch points PE and PF to the touch points PA and PB, i.e. the touch points of the touch area SNA move towards the side S1. Now, the first touch reference points in the first sensing result DT1 correspondingly move from the first touch reference points T1E and T1F to the first touch reference points T1A and T1B, i.e. the center point of the first touch reference points moves from the center point CA3 to the center point CA1. According to a moving direction shown in the figure, a moving direction of the center point of the first touch reference points (i.e. a direction from the center point CA3 to the center point CA1) is opposite to the ascending arrangement direction (i.e. the direction opposite to the first direction D1) of the position numbers of the photosensitive pixels of the optical sensor 111.

On the other hand, the second touch reference points in the second sensing result DT2 correspondingly move from the second touch reference points T2E and T2F to the second touch reference points T2A and T2B, i.e. the center point of the second touch reference points moves from the center point CB3 to the center point CB1. According to a moving direction shown in the figure, a moving direction of the center point of the second touch reference points (i.e. a direction from the center point CB3 to the center point CB1) is the same to the ascending arrangement direction (i.e. the second direction D2) of the position numbers of the photosensitive pixels of the optical sensor 113.

According to the above descriptions, when the moving amount of the center point (for example, CA1, CA3) of the first touch reference points (for example, T1A, T1B, T1E and T1F) of the first sensing result DT1 that moves along the direction opposite to the first direction D1 is greater than the predetermined value, and the moving amount of the center point (for example, CB1, CB3) of the second touch reference points (for example, T2A, T2B, T2E and T2F) of the second sensing result DT2 that moves along the second direction D2 is greater than the predetermined value, the processing unit 120 determines that the touch gesture of the user moves towards the side S1, i.e. moves upwards in view of the user.

Moreover, the space DA1 is greater than the space DA3, which represents that the space between the first touch reference points is gradually increased along with time. Moreover, the space DB1 is greater than the space DB3, which represents that the space between the second touch reference points is gradually increased along with time. According to the above descriptions, in an embodiment of the disclosure, when the moving amount of the center point (for example, CA1, CA3) of the first touch reference points (for example, T1A, T1B, T1E and T1F) of the first sensing result DT1 that moves along the direction opposite to the first direction D1 is greater than the predetermined value, the moving amount of the center point (for example, CB1, CB3) of the second touch reference points (for example, T2A, T2B, T2E and T2F) of the second sensing result DT2 that moves along the second direction D2 is greater than the predetermined value, the space (for example, DA1, DA3) between the first touch reference points (for example, T1A, T1B, T1E and T1F) is increased and the space (for example, DB1, DB3) between the second touch reference points (for example, T2A, T2B, T2E and T2F) is increased, the processing unit 120 determines that the touch gesture of the user moves upwards.

FIG. 3A-FIG. 3C are schematic diagrams illustrating an optical touch module senses a touch gesture of a touch area according to a third embodiment of the disclosure. Referring to FIG. 1A-FIG. 1C and FIG. 3A-FIG. 3C, a difference there between is that the touch points (for example, PA, PB, PG and PH) sensed by the optical touch module 100 are different, i.e. a brightness schematic diagram of the first sensing results DT1 of FIG. 3B is different to that of FIG. 1B, and a brightness schematic diagram of the second sensing results DT2 of FIG. 3C is different to that of FIG. 1C.

In an embodiment of the disclosure, it is assumed that a plurality of touch points (two touch points are taken as an example for descriptions) of the touch area SNA move from the touch points PA and PB to the touch points PG and PH, i.e. the touch points of the touch area SNA move towards the corner C1, and the space between the touch points PA and PB is approximately the same to a space between the touch points PG and PH. Now, the first touch reference points in the first sensing result DT1 correspondingly move from the first touch reference points T1A and T1B to the first touch reference points T1G and T1H. However, since the center point CA1 of the first touch reference points T1A and T1B is overlapped to the center point CA4 of the first touch reference points T1G and T1H, which represents that the center point of the first touch reference points is not moved, i.e. the moving amount of the center point of the first touch reference points is smaller than or equal to the predetermined value.

On the other hand, the second touch reference points in the second sensing result DT2 correspondingly move from the second touch reference points T2A and T2B to the second touch reference points T2G and T2H, i.e. a center point of the second touch reference points moves from the center point CB1 of the second touch reference points T2A and T2B to a center point CB4 of the second touch reference points T2G and T2H. According to a moving direction shown in the figure, a moving direction of the center point of the second touch reference points (i.e. a direction from the center point CB1 to the center point CB4) is the same to the ascending arrangement direction (i.e. the second direction D2) of the position numbers of the photosensitive pixels of the optical sensor 113. According to the above descriptions, when the moving amount of the center point (for example, CA1, CA4) of the first touch reference points (for example, T1A, T1B, T1G and T1H) of the first sensing result DT1 is smaller than or equal to the predetermined value, and the moving amount of the center point (for example, CB1, CB4) of the second touch reference points (for example, T2A, T2B, T2G and T2H) of the second sensing result DT2 that moves along the second direction D2 is greater than the predetermined value, the processing unit 120 determines that the touch gesture of the user moves towards the corner C1, i.e. moves to the upper left in view of the user.

Moreover, since the touch points PG and PH are closer to the optical sensor 111 compared to the touch points PA and PB, a space DA4 between the first touch reference points T1G and T1H is greater than the space DA1 between the first touch reference points T1A and T1B, i.e. the space between the first touch reference points is gradually increased along with time. Moreover, in the present embodiment, since the touch points PG and PH are away from the optical sensor 113 compared to the touch points PA and PB, a space DB4 between the second touch reference points T2G and T2H is smaller than the space DB1 between the second touch reference points T2A and T2B, i.e. the space between the second touch reference points is gradually decreased along with time. In other embodiments, due to different sliding angles of the touch gesture, the touch points PG and PH are probably closer to the optical sensor 113 compared to the touch points PA and PB, or distances between the touch points PG and PH and the optical sensor 113 are approximately the same to distances between the touch points PA and PB and the optical sensor 113, i.e. the space between the second touch reference points is probably gradually decreased or maintained unchanged along with time.

According to the above descriptions, in an embodiment of the disclosure, when the moving amount of the center point (for example, CA1, CA4) of the first touch reference points (for example, T1A, T1B, T1G and T1H) of the first sensing result DT1 is smaller than or equal to the predetermined value, the moving amount of the center point (for example, CB1, CB4) of the second touch reference points (for example, T2A, T2B, T2G and T2H) of the second sensing result DT2 that moves along the second direction D2 is greater than the predetermined value, and the space (for example, DA1, DA4) between the first touch reference points (for example, T1A, T1B, T1G and T1H) is increased, the processing unit 120 determines that the touch gesture of the user moves to the upper left.

In an embodiment of the disclosure, it is assumed that a plurality of the touch points (two touch points are taken as an example for descriptions) of the touch area SNA move from the touch points PG and PH to the touch points PA and PB, i.e. the touch points of the touch area SNA move towards the corner C3. Now, the first touch reference points in the first sensing result DT1 correspondingly move from the first touch reference points T1G and T1H to the first touch reference points T1A and T1B. However, since the center point CA1 of the first touch reference points T1A and T1B is overlapped to the center point CA4 of the first touch reference points T1G and T1H, which represents that the center point of the first touch reference points is not moved, i.e. the moving amount of the center point of the first touch reference points is smaller than or equal to the predetermined value.

On the other hand, the second touch reference points in the second sensing result DT2 correspondingly move from the second touch reference points T2G and T2H to the second touch reference points T2A and T2B, i.e. the center point of the second touch reference points moves from the center point CB4 to the center point CB1. According to a moving direction shown in the figure, a moving direction of the center point of the second touch reference points (i.e. a direction from the center point CB4 to the center point CB1) is opposite to the ascending arrangement direction (i.e. the direction opposite to the second direction D2) of the position numbers of the photosensitive pixels of the optical sensor 113.

According to the above descriptions, when the moving amount of the center point (for example, CA1, CA4) of the first touch reference points (for example, T1A, T1B, T1G and T1H) of the first sensing result DT1 is smaller than or equal to the predetermined value, and the moving amount of the center point (for example, CB1, CB4) of the second touch reference points (for example, T2A, T2B, T2G and T2H) of the second sensing result DT2 that moves along the direction opposite to the second direction D2 is greater than the predetermined value, the processing unit 120 determines that the touch gesture of the user moves towards the corner C3, i.e. moves to the lower right in view of the user.

Moreover, the space DA1 is smaller than the space DA3, which represents that the space between the first touch reference points is gradually decreased along with time. Moreover, in the present embodiment, the space DB1 is greater than the space DB4, though in other embodiments, due to different gesture sliding angles, the space DB1 is probably greater than or equal to the space DB4. According to the above descriptions, in an embodiment of the disclosure, when the moving amount of the center point (for example, CA1, CA4) of the first touch reference points (for example, T1A, T1B, T1G and T1H) of the first sensing result DT1 is smaller than or equal to the predetermined value, the moving amount of the center point (for example, CB1, CB4) of the second touch reference points (for example, T2A, T2B, T2G and T2H) of the second sensing result DT2 that moves along the direction opposite to the second direction D2 is greater than the predetermined value, and the space (for example, DA1, DA4) between the first touch reference points (for example, T1A, T1B, T1G and T1H) is decreased, the processing unit 120 determines that the touch gesture of the user moves to the lower right.

According to the above descriptions, it is known that when the touch points of the touch area SNA move towards the corner C2, the moving direction of the center point of the first touch reference points is opposite to the ascending arrangement direction of the position numbers of the photosensitive pixels of the optical sensor 111 (i.e. the direction opposite to the first direction D1), and the space between the first touch reference points are probably increased, decreased or maintained unchanged along with time. Moreover, the moving amount of the center point of the second touch reference points is smaller than or equal to the predetermined value, and the space between the second touch reference points are gradually increased along with time. Therefore, when the moving amount of the center point of the first touch reference points that moves along the direction opposite to the first direction D1 is greater than the predetermined value, and the moving amount of the center point of the second touch reference points is smaller than or equal to the predetermined value, the processing unit 120 determines that the touch gestures moves towards the corner C2, i.e. moves to the upper right in view of the user. Alternatively, when the moving amount of the center point of the first touch reference points that moves along the direction opposite to the first direction D1 is greater than the predetermined value, the moving amount of the center point of the second touch reference points is smaller than or equal to the predetermined value, and the space between the second touch reference points are increased, the processing unit 120 determines that the touch gestures moves to the upper right.

On the other hand, when the touch points of the touch area SNA move towards the corner C4, the moving direction of the center point of the first touch reference points is the same to the ascending arrangement direction of the position numbers of the photosensitive pixels of the optical sensor 111 (i.e. the first direction D1), and the space between the first touch reference points are probably increased, decreased or maintained unchanged along with time. Moreover, the moving amount of the center point of the second touch reference points is smaller than or equal to the predetermined value, and the space between the second touch reference points are gradually decreased along with time. Therefore, when the moving amount of the center point of the first touch reference points that moves along the first direction D1 is greater than the predetermined value, and the moving amount of the center point of the second touch reference points is smaller than or equal to the predetermined value, the processing unit 120 determines that the touch gestures moves towards the corner C4, i.e. moves to the lower left in view of the user. Alternatively, when the moving amount of the center point of the first touch reference points that moves along the first direction D1 is greater than the predetermined value, the moving amount of the center point of the second touch reference points is smaller than or equal to the predetermined value, and the space between the second touch reference points are decreased, the processing unit 120 determines that the touch gestures moves to the lower left.

Moreover, in an embodiment of the disclosure, the touch points of the touch area SNA may draw a circle. A moving direction for drawing the circle clockwise can be decomposed as upper left, up, upper right, right, lower right, down, lower left and left, and in order to separate it from drawing a square (with a moving direction of up, right, down and left), when the processing unit 120 determines that the touch points of the touch area SNA sequentially move towards the upper left, the upper right, the lower right and the lower left (which is equivalent to sequentially move towards the corners C1, C2, C3 and C4), the processing unit 120 determines that the touch gesture of the touch points of the touch area SNA draws a circle clockwise.

Alternatively, since the moving direction for drawing the circle anticlockwise can be decomposed as upper left, left, lower left, down, lower right, right, upper right and up, and in order to separate it from drawing a square (with a moving direction of left, down, right and up), when the processing unit 120 determines that the touch points of the touch area SNA sequentially move towards the upper left, the lower left, the lower right and the upper right (which is equivalent to sequentially move towards the corners C1, C4, C3 and C2), the processing unit 120 determines that the touch gesture of the touch points of the touch area SNA draws a circle anticlockwise. Moreover, if drawing of the circle clockwise and drawing of the circle anticlockwise are continuous gestures, the processing unit 120 determines that the touch gesture of the user is to draw "8". Descriptions of the aforementioned embodiments can be referred for the method of sensing the touch points to move towards the upper left, the lower left, the lower right or the upper right, which is not repeated.

Figure 4A:
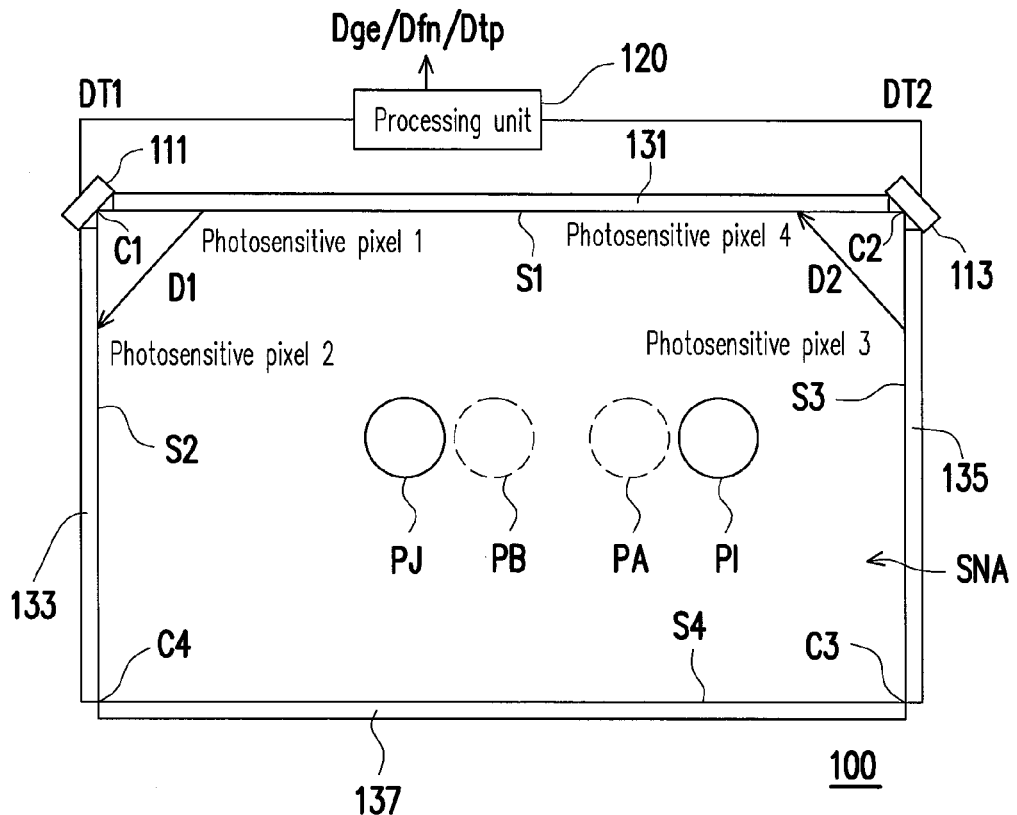
FIG. 4A-FIG. 4C are schematic diagrams illustrating an optical touch module senses a touch gesture of a touch area according to a fourth embodiment of the disclosure.
Figures 4B, 4C:
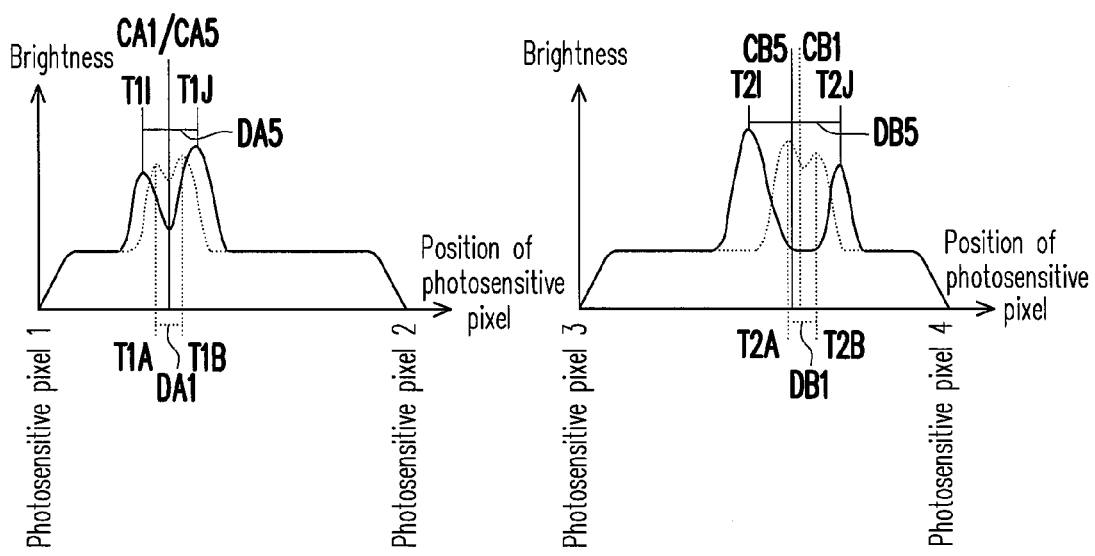

FIG. 4A-FIG. 4C are schematic diagrams illustrating an optical touch module senses a touch gesture of a touch area according to a fourth embodiment of the disclosure. Referring to FIG. 1A-FIG. 1C and FIG. 4A-FIG. 4C, a difference there between is that the touch points (for example, PA, PB, PI and PJ) sensed by the optical touch module 100 are different, i.e. a brightness schematic diagram of the first sensing results DT1 of FIG. 4B is different to that of FIG. 1B, and a brightness schematic diagram of the second sensing results DT2 of FIG. 4C is different to that of FIG. 1C.

In an embodiment of the disclosure, it is assumed that a plurality of touch points (two touch points are taken as an example for descriptions) of the touch area SNA move from the touch points PA and PB to the touch points PI and PJ, i.e. the touch points of the touch area SNA move from a center of the touch area SNA to edges thereof, and the space between the touch points PA and PB is smaller than a space between the touch points PI and PJ. Now, the first touch reference points in the first sensing result DT1 correspondingly move from the first touch reference points T1A and T1B to the first touch reference points T1I and T1J. However, since the center point CA1 of the first touch reference points T1A and T1B is overlapped to a center point CA5 of the first touch reference points T1I and T1J, which represents that the center point of the first touch reference points is not moved, i.e. the moving amount of the center point of the first touch reference points is smaller than or equal to the predetermined value. Moreover, since the space between the touch points PI and PJ is greater than the space between the touch points PA and PB, a space DA5 between the first touch reference points T1I and T1J is greater than the space DA1 between the first touch reference points T1A and T1B, i.e. the space between the first touch reference points is gradually increased along with time.

On the other hand, the second touch reference points in the second sensing result DT2 correspondingly move from the second touch reference points T2A and T2B to the second touch reference points T2I and T2J, i.e. a center point of the second touch reference points moves from the center point CB1 of the second touch reference points T2A and T2B to a center point CB5 of the second touch reference points T2I and T2J. In the present embodiment, the space between the center point CB1 and the center point CB5 is caused by the touch mechanism or uneven moving amounts of the touch points (for example, PA, PB, PI and PJ), which is not expected in forming the touch gesture, so that the space between the center point CB1 and the center point CB5 is set to be smaller than or equal to the predetermined value, and the center point of the second touch reference points is regarded to be unmoved. Moreover, since the space between the touch points PI and PJ is greater than the space between the touch points PA and PB, the space DB5 between the second touch reference points T2I and T2J is greater than the space DB1 between the second touch reference points T2A and T2B, i.e. the space between the second touch reference points is gradually increased along with time.

According to the above descriptions, when the moving amount of the center point (for example, CA1, CA5) of the first touch reference points (for example, T1A, T1B, T1I and T1J) of the first sensing result DT1 is smaller than or equal to the predetermined value, the moving amount of the center point (for example, CB1, CB5) of the second touch reference points (for example, T2A, T2B, T2I and T2J) of the second sensing result DT2 is smaller than or equal to the predetermined value, the space (for example, DA1, DA5) between the first touch reference points (for example, T1A, T1B, T1I and T1J) is increased and the space (for example, DB1, DB5) between the second touch reference points (for example, T2A, T2B, T2I and T2J) is increased, the processing unit 120 determines that the touch gesture of the user is spread, i.e. the fingers spread in view of the user.

In an embodiment of the disclosure, it is assumed that a plurality of touch points (two touch points are taken as an example for descriptions) of the touch area SNA move from the touch points PI and PJ to the touch points PA and PB, i.e. the touch points of the touch area SNA move from the edges of the touch area towards the center thereof. Now, the first touch reference points in the first sensing result DT1 correspondingly move from the first touch reference points T1I and T1J to the first touch reference points T1A and T1B. However, since the center point CA1 is overlapped to the center point CA4, which represents that the center point of the first touch reference points is not moved, i.e. the moving amount of the center point of the first touch reference points is smaller than or equal to the predetermined value. Moreover, the space DA1 is smaller than the space DA5, which represents that the space between the first touch reference points is gradually decreased along with time.

On the other hand, the second touch reference points in the second sensing result DT2 correspondingly move from the second touch reference points T2I and T2J to the second touch reference points T2A and T2B, where the space between the center point CB1 and the center point CB5 is set to be smaller than or equal to the predetermined value, i.e. the center point of the second touch reference points is regarded unmoved. Moreover, the space DB1 is smaller than the space DB5, which represents that the space of the first touch reference points is gradually decreased along with time.

According to the above descriptions, when the moving amount of the center point (for example, CA1, CA5) of the first touch reference points (for example, T1A, T1B, T1I and T1J) of the first sensing result DT1 is smaller than or equal to the predetermined value, the moving amount of the center point (for example, CB1, CB5) of the second touch reference points (for example, T2A, T2B, T2I and T2J) of the second sensing result DT2 is smaller than or equal to the predetermined value, the space (for example, DA1, DA5) between the first touch reference points (for example, T1A, T1B, T1I and T1J) is decreased and the space (for example, DB1, DB5) between the second touch reference points (for example, T2A, T2B, T2I and T2J) is decreased, the processing unit 120 determines that the touch gesture of the user is pinch, i.e. the fingers grasp inward in view of the user.

Figure 5A:
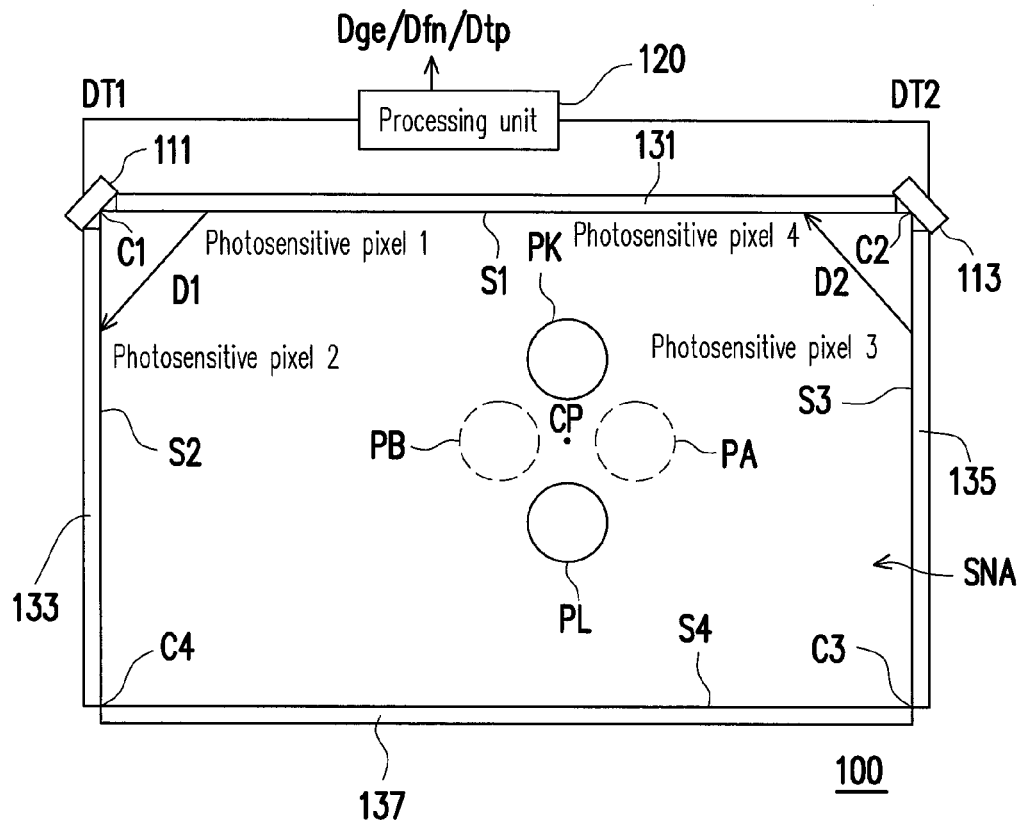
FIG. 5A-FIG. 5C are schematic diagrams illustrating an optical touch module senses a touch gesture of a touch area according to a fifth embodiment of the disclosure.
Figures 5B, 5C:
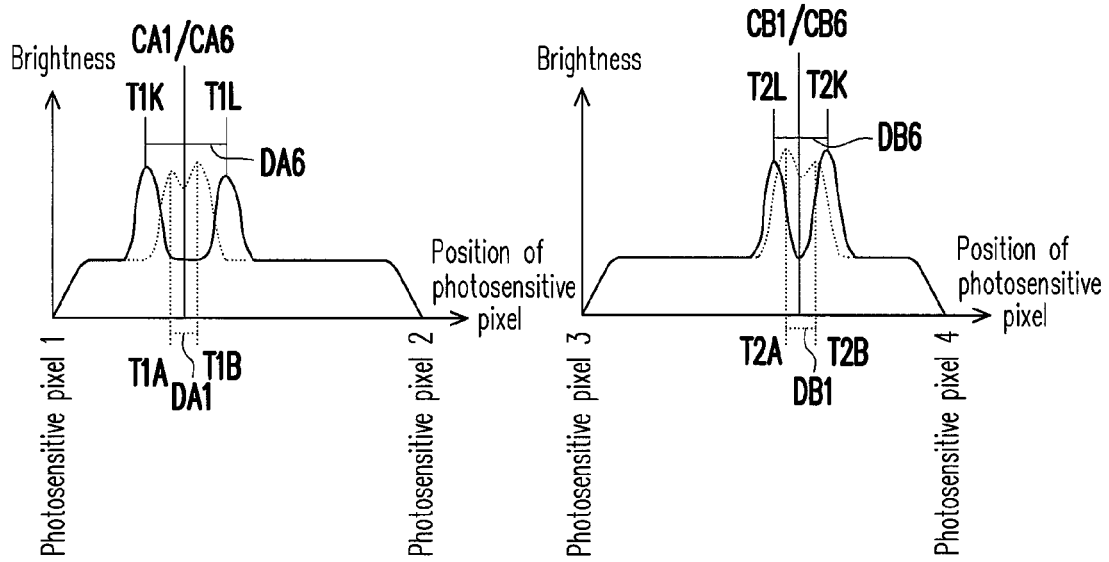

FIG. 5A-FIG. 5C are schematic diagrams illustrating an optical touch module senses a touch gesture of a touch area according to a fifth embodiment of the disclosure. Referring to FIG. 1A-FIG. 1C and FIG. 5A-FIG. 5C, a difference there between is that the touch points (for example, PA, PB, PK and PL) sensed by the optical touch module 100 are different, i.e. a brightness schematic diagram of the first sensing results DT1 of FIG. 5B is different to that of FIG. 1B, and a brightness schematic diagram of the second sensing results DT2 of FIG. 5C is different to that of FIG. 1C.

In an embodiment of the disclosure, it is assumed that a plurality of touch points (two touch points are taken as an example for descriptions) of the touch area SNA respectively and sequentially move to positions of the touch points PA, PK and PB and sequentially move to positions of the touch points PB, PL and PA, or sequentially move to positions of the touch points PA, PL and PB and sequentially move to positions of the touch points PB, PK and PA, i.e. the touch points of the touch area SNA rotate along a center point CP of the touch points (i.e. draw a circle), and the space between the touch points PA and PB is approximately equal to a space between the touch points PK and PL.

Now, the first touch reference points in the first sensing result DT1 correspondingly move from the first touch reference points T1A and T1B to the first touch reference points T1K and T1L, and then move to the first touch reference points T1B and T1A. Since the center point CA1 of the first touch reference points T1A and T1B is overlapped to a center point CA6 of the first touch reference points T1K and T1L, which represents that the center point of the first touch reference points is not moved, i.e. the moving amount of the center point of the first touch reference points is smaller than or equal to the predetermined value. Moreover, a space DA6 between the first touch reference points T1K and T1L is greater than the space DA1 between the first touch reference points T1A and T1B, i.e. the space between the first touch reference points is periodically increased and decreased along with time.

On the other hand, the second touch reference points in the second sensing result DT2 correspondingly move from the second touch reference points T2A and T2B to the second touch reference points T2K and T2L, and then move to the second touch reference points T2B and T2A. Since the center point CB1 of the second touch reference points T2A and T2B is overlapped to a center point CA6 of the second touch reference points T2K and T2L, which represents that the center point of the second touch reference points is not moved, i.e. the moving amount of the center point of the second touch reference points is smaller than or equal to the predetermined value. Moreover, a space DB6 between the second touch reference points T2K and T2L is greater than the space DB1 between the second touch reference points T2A and T2B, i.e. the space between the second touch reference points is periodically increased and decreased along with time.

According to the above descriptions, when the moving amount of the center point (for example, CA1, CA6) of the first touch reference points (for example, T1A, T1B, T1K and T1L) of the first sensing result DT1 is smaller than or equal to the predetermined value, the moving amount of the center point (for example, CB1, CB6) of the second touch reference points (for example, T2A, T2B, T2K and T2L) of the second sensing result DT2 is smaller than or equal to the predetermined value, the space (for example, DA1, DA6) between the first touch reference points (for example, T1A, T1B, T1K and T1L) is periodically increased and decreased and the space (for example, DB1, DB6) between the second touch reference points (for example, T2A, T2B, T2K and T2L) is periodically increased and decreased, the processing unit 120 determines that the touch gesture of the user is a turning gesture, i.e. the fingers rotate in situ in view of the user.

Moreover, according to the embodiments of FIG. 1A-FIG. 1C, FIG. 2A-FIG. 2C, FIG. 3A-FIG. 3C, FIG. 4A-FIG. 4C and FIG. 5A-FIG. 5C, when the moving amount of the center point (for example, CA1-CA6) of the first touch reference points (for example, T1A-T1L) of the first sensing result DT1 is greater than the predetermined value, or the moving amount of the center point (for example, CB1-CB6) of the second touch reference points (for example, T2A-T2L) of the second sensing result DT2 is greater than the predetermined value, the processing unit 120 determines that the touch gesture of the user move to the upper left, the left, the lower left, the bottom, the lower right, the right, the upper right or the top, so that it is unnecessary to confirm a variation of the space between the first touch reference points (for example, T1A-T1L) and a variation of the space between the second touch reference points (for example, T2A-T2L). Comparatively, when the moving amount of the center point (for example, CA1-CA6) of the first touch reference points (for example, T1A-T1L) of the first sensing result DT1 is smaller than or equal to the predetermined value and the moving amount of the center point (for example, CB1-CB6) of the second touch reference points (for example, T2A-T2L) of the second sensing result DT2 is smaller than or equal to the predetermined value, the processing unit 120 determines the touch gesture of the user as fingers spread, fingers grasp inward or fingers rotate in situ, and the variation of the space between the first touch reference points (for example, T1A-T1L) and the variation of the space between the second touch reference points (for example, T2A-T2L) are confirmed to further determine the touch gesture of the user.

Figure 6A:
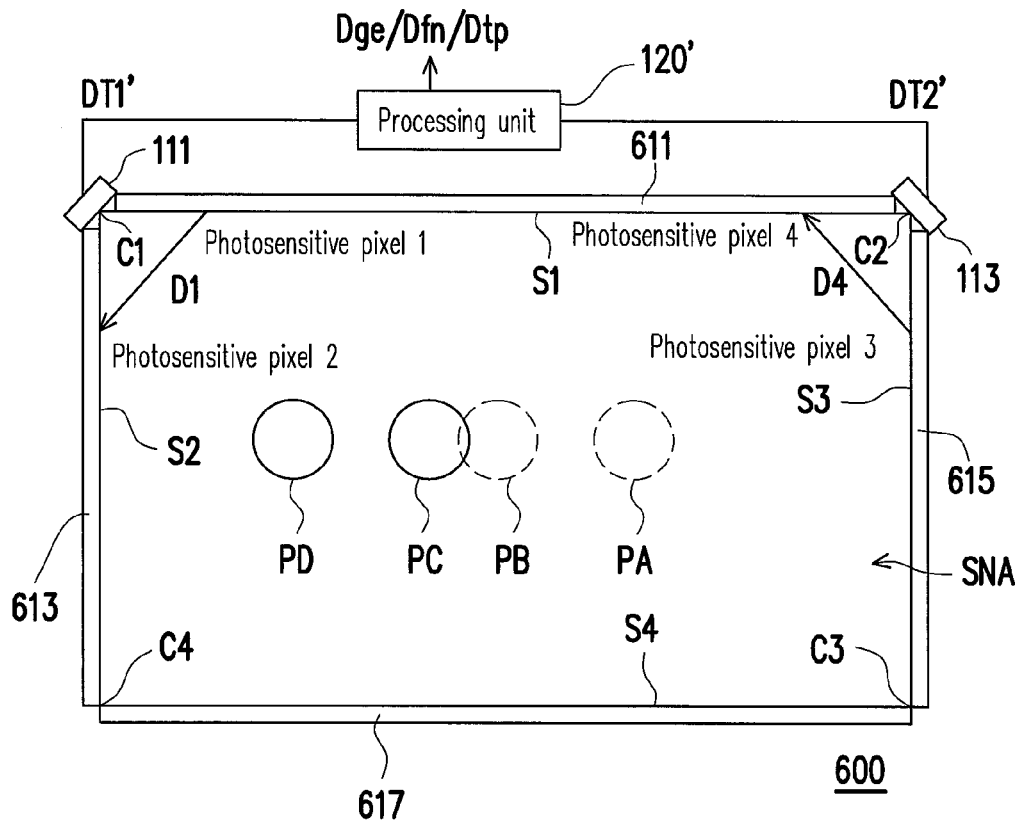
FIG. 6A-FIG. 6C are schematic diagrams illustrating an optical touch module senses a touch gesture of a touch area according to a sixth embodiment of the disclosure.
Figures 6B, 6C:
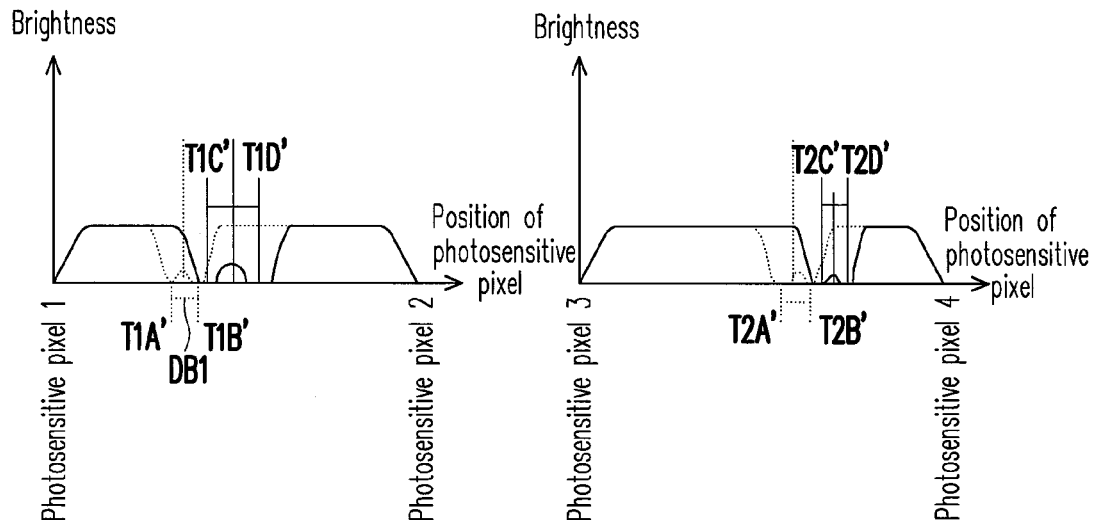

FIG. 6A-FIG. 6C are schematic diagrams illustrating an optical touch module senses a touch gesture of a touch area according to a sixth embodiment of the disclosure. Referring to FIG. 1A and FIG. 6A, a difference there between lies in a plurality of light-reflecting bars 611, 613, 615 and 617 of the optical touch module 600, where the light-reflecting bars 611, 613, 615 and 617 are respectively disposed at the sides S1, S2, S3 and S4 of the touch area SNA. Moreover, according to a brightness schematic diagram of the first sensing results DTP of FIG. 6B, and a brightness schematic diagram of the second sensing results DT2' of FIG. 6C, the first touch reference points (for example, T1A'-T1D') and the second touch reference points (for example, T2A'-T2D') corresponding to the touch points (for example, PA-PD) in the first sensing results DT1' and the second sensing results DT2' are respectively points with lower brightness (i.e. dark points). Descriptions of the aforementioned embodiments of FIG. 1A-FIG. 1C, FIG. 2A-FIG. 2C, FIG. 3A-FIG. 3C, FIG. 4A-FIG. 4C and FIG. 5A-FIG. 5C can be referred for the method that the processing unit 120' determines gestures, which is not repeated.

According to the above descriptions, the processing unit (for example, 120, 120') of the optical touch module (for example, 100, 600) determines the touch gesture of the user according to the center points (for example, CA1-CA6) of a plurality of the first touch reference points (for example, T1A-T1L, T1A'-T1D') of each of the first sensing results (for example, DT1, DT1'), and the center points (for example, CB1-CB6) of a plurality of the second touch reference points (for example, T2A-T2L, T2A'-T2D') of each of the second sensing results (for example, DT2, DT2'). Alternatively, the processing unit (for example, 120, 120') of the optical touch module (for example, 100, 600) determines the touch gesture of the user according to the center points (for example, CA1-CA6) of a plurality of the first touch reference points (for example, T1A-T1L, T1A'-T1D') of each of the first sensing results (for example, DT1, DT1'), the spaces (for example, DA1-DA6) between the first touch reference points (for example, T1A-T1L, T1A'-T1D'), the center points (for example, CB1-CB6) of a plurality of the second touch reference points (for example, T2A-T2L, T2A'-T2D') of each of the second sensing results (for example, DT2, DT2'), and the spaces (for example, DB1-DB6) between the second touch reference points (for example, T2A-T2L, T2A'-T2D'). Moreover, the method that the processing unit (for example, 120, 120') of the optical touch module (for example, 100, 600) determines the touch gestures can be referred to deduce a method for determining gestures of an optical touch module.

Figure 7:
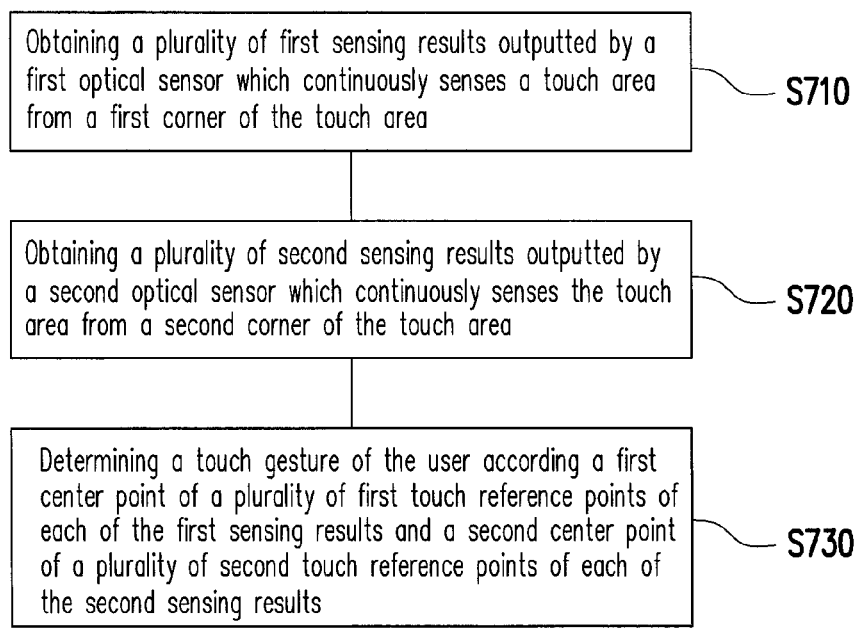
FIG. 7 is a flowchart illustrating a method for determining gestures of an optical touch module according to an embodiment of the disclosure.

FIG. 7 is a flowchart illustrating a method for determining gestures of an optical touch module according to an embodiment of the disclosure. Referring to FIG. 7, in the present embodiment, a plurality of first sensing results outputted by a first optical sensor which continuously senses a touch area from a first corner of the touch area are obtained (step S710), and a plurality of second sensing results outputted by a second optical sensor which continuously senses the touch area from a second corner of the touch area are obtained (step S720). Moreover, a touch gesture of the user is determined according a first center point of a plurality of first touch reference points of each of the first sensing results and a second center point of a plurality of second touch reference points of each of the second sensing results (step S730).

Figure 8:
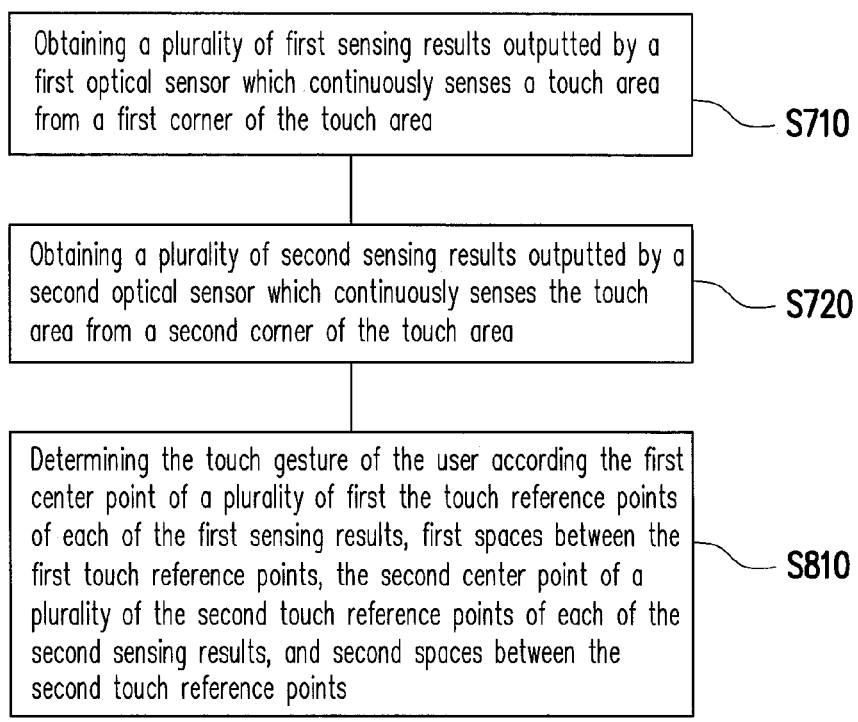
FIG. 8 is a flowchart illustrating a method for determining gestures of an optical touch module according to another embodiment of the disclosure.

FIG. 8 is a flowchart illustrating a method for determining gestures of an optical touch module according to another embodiment of the disclosure. Referring to FIG. 7 and FIG. 8, a difference there between lies in a step S810. In the step S810, the touch gesture of the user is determined according the first center point of a plurality of first the touch reference points of each of the first sensing results, first spaces between the first touch reference points, the second center point of a plurality of the second touch reference points of each of the second sensing results, and second spaces between the second touch reference points.

A sequence of the above steps (S710, S720, S730 and S810) is used as an example, and the disclosure is not limited thereto. Moreover, the embodiments of FIG. 1A-FIG. 1C, FIG. 2A-FIG. 2C, FIG. 3A-FIG. 3C, FIG. 4A-FIG. 4C, FIG. 5A-FIG. 5C and FIG. 6A-FIG. 6C can be referred for details of the above steps, which are not repeated.

The disclosure also provides a computer readable medium, which includes a program used for executing the aforementioned method for determining gestures of an optical touch module, and after the above program is loaded to a central processing unit (CPU) or a similar device and executed, the steps of the method for determining gestures of an optical touch module are implemented.

In summary, in the optical touch module, the method for determining gestures thereof and the computer-readable medium, the touch gesture of the user is determined according to the first center point of the first touch reference points of each of the first sensing results and the second center point of the second touch reference points of each of the second sensing results, or the touch gesture of the user is determined according to the first center point of the first touch reference points of each of the first sensing results, the spaces between the first touch reference points, the second center point of the second touch reference points of each of the second sensing results and the spaces between the second touch reference points. In this way, the optical touch module can accurately determine the touch gesture of the user without determining positions of the touch points, by which touch convenience of the optical touch module is enhanced.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. An optical touch module, comprising:
a first optical sensor, disposed at a first corner of a touch area, and continuously sensing the touch area to output a plurality of first sensing results;
a second optical sensor, disposed at a second corner of the touch area, and continuously sensing the touch area to output a plurality of second sensing results; and
a processing unit, coupled to the first optical sensor and the second optical sensor, and configured at least to:
receive the first sensing results and the second sensing results;
calculate a first center point of a plurality of first touch reference points of the first sensing results, a second center point of a plurality of second touch reference points of the second sensing results, a first space between the first touch reference points of the first sensing results, and a second space between the second touch reference points of the second sensing results; and
determine a gesture by comparing first center points of a current first sensing result and a previous first sensing result, comparing second center points of a current second sensing result and a previous second sensing result, comparing first spaces of the current first sensing result and the previous first sensing result, and comparing second spaces of the current second sensing result and the previous second sensing result, wherein the first touch reference points and the second touch reference points are corresponded to touch points of fingers, an ascending arrangement direction of position numbers of a plurality of first photosensitive pixels of the first optical sensor is the same to a first direction from a first side of the touch area to a second side of the touch area, and an ascending arrangement direction of position numbers of a plurality of second photosensitive pixels of the second optical sensor is the same to a second direction from a third side of the touch area to the first side of the touch area, the first corner is formed by the first side and the second side, and the second corner is formed by the first side and the third side,
wherein when a moving amount from the first center point of the current first sensing result to the first center point of the previous first sensing result is along the first direction and greater than a predetermined value, a moving amount from the second center point of the current second sensing result to the second center point of the previous second sensing result is along the second direction and greater than the predetermined value, the first space of the current first sensing result is greater than the first space of the previous first sensing result, and the second space of the current second sensing result is smaller than the second space of the previous second sensing result, the processing unit determines that the gesture moves towards the second side.

2. The optical touch module as claimed in claim 1, wherein when the moving amount from the first center point of the current first sensing result to the first center point of the previous first sensing result is along a direction opposite to the first direction and greater than the predetermined value and the moving amount from the second center point of the current second sensing result to the second center point of the previous second sensing result is along a direction opposite to the second direction is greater than the predetermined value, the processing unit determines that the gesture moves towards the third side.

3. The optical touch module as claimed in claim 1, wherein the processing unit determines the gesture according to the continuous first sensing results having the first touch reference points and the continuous second sensing results having the second touch reference points.

4. The optical touch module as claimed in claim 1, further comprising:
a plurality of light-absorbing bars, disposed at a plurality of sides of the touch area,
wherein the first touch reference points and the second touch reference points are respectively a bright point.

5. A method for determining gestures of an optical touch module, comprising:
obtaining a plurality of first sensing results outputted by a first optical sensor which continuously senses a touch area from a first corner of the touch area;
obtaining a plurality of second sensing results outputted by a second optical sensor which continuously senses the touch area from a second corner of the touch area;
calculating a first center point of a plurality of first touch reference points of the first sensing results, a second center point of a plurality of second touch reference points of the second sensing results, a first space between the first touch reference points of the first sensing results, and a second space between the second touch reference points of the second sensing results; and
determining a gesture by comparing first center points of a current first sensing result and a previous first sensing result, comparing second center points of a current second sensing result and a previous second sensing result, comparing first spaces of the current first sensing result current first sensing result and the previous first sensing result, and comparing second spaces of the current second sensing result and the previous second sensing result, wherein the first touch reference points and the second touch reference points are corresponded to touch points of fingers, an ascending arrangement direction of position numbers of a plurality of first photosensitive pixels of the first optical sensor is the same to a first direction from a first side of the touch area to a second side of the touch area, and an ascending arrangement direction of position numbers of a plurality of second photosensitive pixels of the second optical sensor is the same to a second direction from a third side of the touch area to the first side of the touch area, the first corner is formed by the first side and the second side, and the second corner is formed by the first side and the third side, wherein the step of determining the gesture comprises:

determining that the gesture moves towards the second side when a moving amount from the first center point of the current first sensing result to the first center point of the previous first sensing result is along the first direction and greater than a predetermined value, a moving amount from the second center point of the current second sensing result to the second center point of the previous second sensing result is along the second direction and greater than the predetermined value, the first space of the current first sensing result is greater than the first space of the previous first sensing result, and the second space of the current second sensing result is smaller than the second space between the second touch reference points of the previous second sensing result.

6. The method for determining gestures of the optical touch module as claimed in claim 5, wherein the step of determining the gesture further comprises:

determining that the gesture moves towards the third side when the moving amount from the first center point of the current first sensing result to the first center point of the previous first sensing result is along a direction opposite to the first direction and greater than the predetermined value and the moving amount from the second center point of the current second sensing result to the second center point of the previous second sensing result is along a direction opposite to the second direction is greater than the predetermined value.

7. A non-transitory computer-readable medium, configured to store a program, wherein the program is used to execute the method for determining gestures of the optical touch module as claimed in claim 5.

* * * * *